Aug. 9, 1949.    F. McMANIS    2,478,832
FLUID PRESSURE OPERATED GATE VALVE
Filed Sept. 12, 1947    2 Sheets-Sheet 2

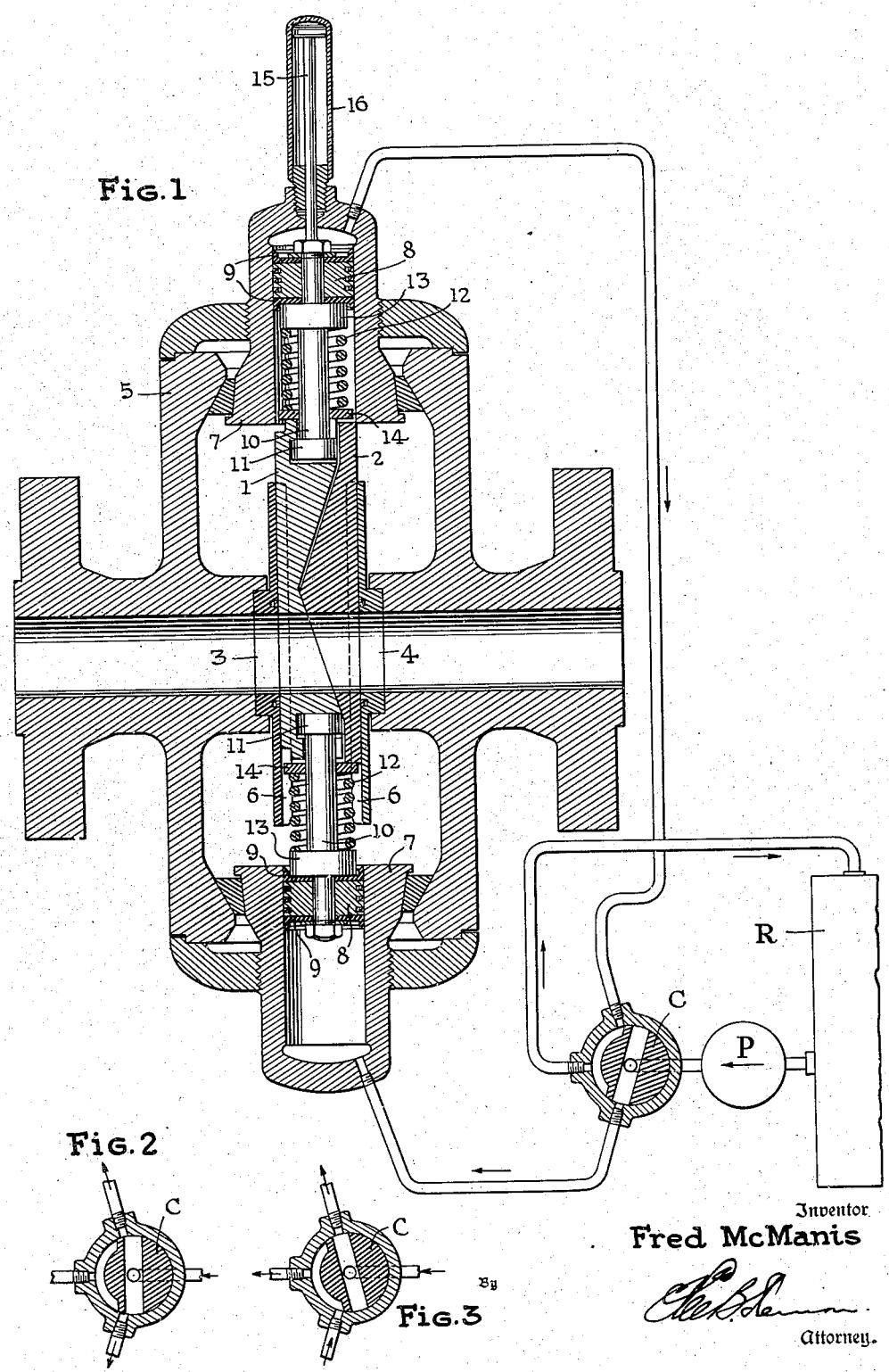

Inventor
Fred McManis
Attorney.

Patented Aug. 9, 1949

2,478,832

UNITED STATES PATENT OFFICE 2,478,832

FLUID PRESSURE OPERATED GATE VALVE

Fred McManis, Houston, Tex., assignor to W-K-M Company, Inc., Houston, Tex., a corporation of Texas Application September 12, 1947, Serial No. 773,637

11 Claims. (Cl. 137—139)

This invention relates to valves of the "through-conduit" gate type, intended primarily for controlling the flow of fluids in the larger size conduits and pipes in which the fluid pressure, in the line to be controlled, may be as high as 10,000–15,000 pounds per square inch. These pipe lines and conduits vary in size from 2" to 30" in diameter. Manual operation, particularly of the larger size control valves, in pipe lines and conduits in which the fluid pressure is of such high order, has been found to be both difficult and hazardous; and, the problem of the art, solved by the present invention, has been to provide a safe and certain means, for the operation of valves in these high pressure lines which handle, notably, hydrocarbon gas and oil, in production, distribution, and in distribution manifolds for the handling of these fluids. By "through-conduit" valve is intended one which in open position leaves the conduit entirely unobstructed at the valve opening.

It is an object of this invention then to provide a combined valve and associated fluid pressure means for positively operating the valve into its open and closed positions; to provide such fluid pressure means that can be remotely controlled; and to provide a fluid pressure operating means so designed and proportioned that the valve can be positively moved to either its open or closed position regardless of the existing fluid pressure in the pipe or conduit in which the valve is located.

It is a further object of this invention to provide a valve and its operating mechanism which is completely enclosed, i. e., with no operating parts extending beyond or through the walls of the valve enclosure. This feature eliminates the use of packing glands, and thereby avoids the friction loads, which are excessive, particularly in large valves, where the operating means is external of the valve housing.

A further object of this invention is to provide a valve operating means which exerts its force to move the valve, mainly, by a pushing force, rather than by pulling the parts to be moved. Thus the valve parts are relieved of destructive tension strains, and breakage of said parts is minimized. Also lighter weight valve parts can be used.

A still further object of the present invention is to provide a valve and its operating means enclosed within a common housing, with the moving parts in balance with respect to the fluid pressure obtaining within the housing.

Still another object of this invention is the provision of engagement between the operating elements and the valve that will positively produce an initial relative movement between the two gate valve segments, in order to effect collapsing of the valve segments to their smallest lateral dimension, and to thereby reduce friction wear on the valve and seats during the major part of the valve movements.

These and other objects of this invention will be apparent to those skilled in the art by the following specification, when read in the light of the accompanying drawings which form a part thereof, and in which:

Figure 1 is a sectional elevation, showing the assembled valve and operating means, all enclosed within a housing, together with a diagrammatic illustration of an appropriate remote fluid pressure control for actuating the operating means.

Figures 2 and 3 are views of the control valve C of Figure 1, in which this valve occupies different positions to which it is moved, in controlling the operation of the valve.

Figure 4:
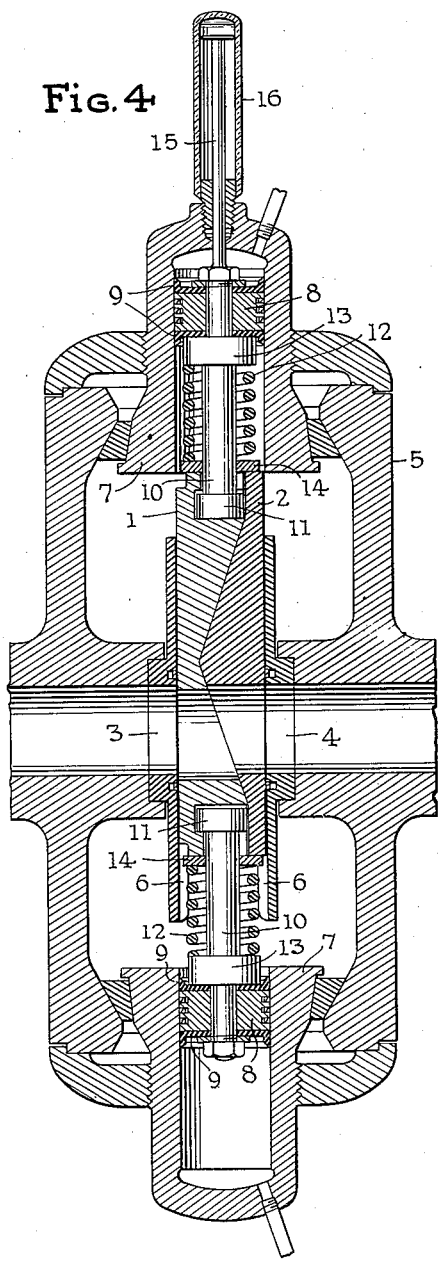

Figure 4 is a view, in vertical section, showing the valve in its collapsed position. As illustrated in this figure, the position of the valve is that which the valve parts take in the initial stage of moving from the open to the closed position. Insofar as only the valve parts are concerned, their relative positions in Figure 4 are the same as when the valve is being moved to the open position, and just before the valve segments have been expanded to the relative positions of Figure 1.

Figure 5:
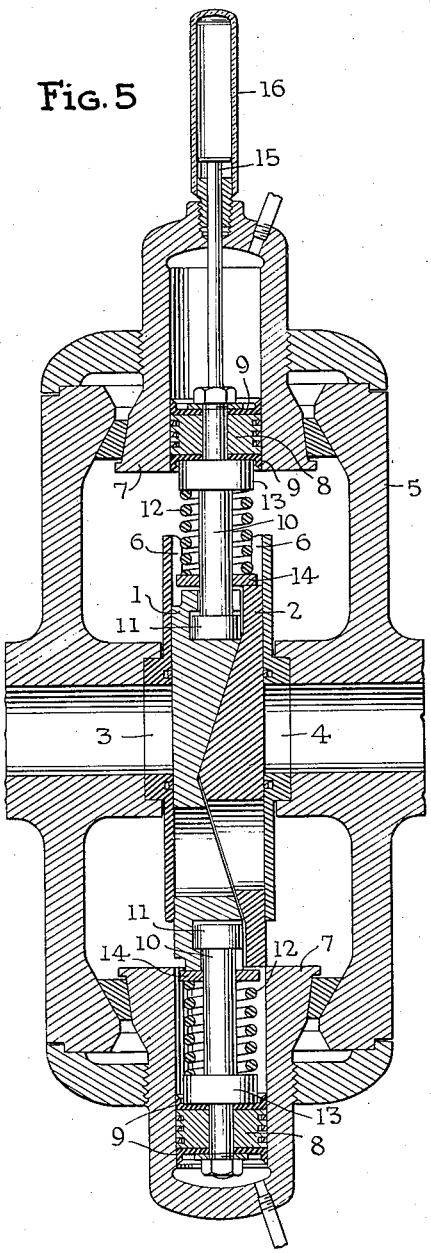

Figure 5 is a view, also in vertical section, showing the valve as it reaches its fully closed position, and with the valve parts expanded into sealing engagement with the valve seats.

Referring to Figure 1 of the drawings, the valve per se, in its essential parts, is shown to be structurally like that shown in the U. S. patent to M. P. Laurent, Reissue No. 20,101, of September 8, 1936, at least to the extent that the gate assembly comprises two double tapered relatively displaceable elements 1 and 2 which herein will be referred to as the gate 1 and segment 2. The abutting faces of the gate and segment diverge in both directions from their middle or waist section, and accordingly, in their relative endwise movement, in either direction, from a centered or collapsed position, there results a wedging action of one part against the other that is effective to expand or force apart the valve parts in order to seal the valve against the seats, in both the open and closed positions. In their centered or collapsed position, as shown in Figure 4, the two valve parts have a minimum over-all lateral dimension which permits them to be moved without appreciable friction between them and their seats.

The gate and segment, when assembled, are substantially rectangular in transverse section, but obviously they may be cylindrical or of other suitable section. If of circular section, the gate and segment when assembled and centered, as in Figure 4, would constitute a cylinder, or part thereof.

Valve seats 3 and 4 are mounted in recesses in the valve housing 5, and extend, at both ends, into the interior of the valve housing, at both sides of the conduit openings. These extensions, together with integral side flanges 6 serve to guide the movements of the gate and segment and to confine them to substantially rectilinear movement.

The segment 2 at the limit of its movement, in either direction, is positively stopped by the end of the segment coming into contact with a fixed abutment 7, one at either end. As shown in each of the figures, the abutments 7 are the inner end walls of end closures of the housing 5, which closures also serve as cylinders for oppositely disposed fluid pressure pistons 8 that operate the valve. These cylinders and pistons, constituting fluid pressure motors, are arranged one at each end of the valve housing 5, and are in axial alinement. Since these motors are alike in construction and operation, a description of one of them will suffice.

The piston 8 of each motor is of conventional construction. It is fitted with the usual sealing rings to prevent passage of fluid in either direction between the piston and the cylinder wall. The piston may be provided, on both sides, with a flexible cleaning cup 9, which serves to remove sediment or other accumulation from the walls of the cylinder, as the piston moves, in either direction. A piston rod 10 is rigidly secured to the piston and its end, remote from the piston, is enlarged at 11. This enlarged end of the rod 10 is shaped and dimensioned to fit rather loosely into a T-slot recess in the adjacent end of the gate 1. When assembled with the gate 1, the latter is thereby connected with the piston and moves therewith, although the T-slot in the segment permits slight relative movement between the enlarged end 11 of the piston rod 10 and the gate 1. The amount of this permissible relative movement must be sufficient to permit the gate 1 to move laterally, toward and away from its seat, as the gate and segment are expanded by mutual wedging action, and to collapse from their expanded position when the wedging force is relieved.

Surrounding the piston rod 10 is a coiled spring 12 which abuts, at one end, a follower 13 at the piston end of the rod, this follower being preferably fixed to the rod or contacting one side of the piston in order to prevent its movement, in one direction, relative to the piston. At its other end, the spring 12 abuts a washer or follower 14 which is mounted on the piston rod 10, and is slideable therealong. The diameter or lateral dimension of the washer 14 is such that it may engage the ends of both the gate 1 and segment 2; and, the spring 12 is initially loaded or compressed to a degree that the washer 14 will be urged into contact with the end of at least one of the gate elements, i. e. gate 1 or segment 2. The purpose or function of the spring 12, pressing against the washer 14 is to transmit the working force of the piston 8 to the segment 2, in order to move the latter, positively, after the gate 1 has been moved endwise by its more positive and direct connection with the piston 8 to an extent that has relieved the wedging action between the gate and segment. Thus in Figure 4, if it is assumed as there illustrated, that the valve is being moved from its open to its closed position (the upper piston being subjected to fluid pressure), the gate has been moved sufficiently to collapse or center the gate and segment, and the washer 14 is in contact with the end of the segment 2 and is transmitting the spring pressure as well as the additional force which the spring derives from the piston, to the segment 2. Preferably, the spring 12 should be of such proportion and initially loaded (compressed) so that it will exert a force, upon contact with the segment 2 that is sufficient to break the segment away from its seat, in event it ends to stick and resist initial movement. Continued movement of the piston will then move both the gate and segment until the latter is stopped by the fixed abutment 7, at the end of its permissible travel. At this time, the gate 1 will continue to be moved by the piston and this endwise movement relative to the segment will bring about the mutual wedging action between the gate and segment to expand both elements into sealing engagement with their respective seats. The completed action of the piston operation, in moving the valve from the open position of Figure 1, through the transition position of Figure 4, is shown in Figure 5.

In operating the valve from the closed position of Figure 5 to the open position of Figure 1, the opposite piston (the lower one as illustrated) is energized, and the same movement of the valve parts is accomplished, i. e. the gate 1 is first moved, endwise sufficient to relieve its wedging pressure against the segment, and then the segment begins its movement in response to the force of the spring 12, augmented by that of the operating piston 8.

The T-slot in the ends of the gate 1, in addition to providing the described clearance that permits movement of the gate laterally, with reference to the end 11 of the piston rod 10, is also of sufficient depth to allow for slight endwise movement of the piston operating end 11 before it engages the gate 1. This slight relative movement enables the piston to exert an initial percussive or hammer action that is effective to jar the gate and thereby assist in loosening it from its seat, in event of its sticking for lack of adequate lubrication.

While the valve and its operating mechanism, is shown in each of the figures of the drawing in a vertical position, the valve is equally operative in a horizontal position or at an angle that may be required, by the circumstances of installation.

Since the valve and its operating mechanism is entirely enclosed, it is desirable, if not necessary, to have some external means to indicate, visually, the position of the valve. For this purpose I have provided, at one end of the casing, an indicator rod 15, secured to one of the pistons, and extending exteriorly of the valve housing. The extent of this rod that can be seen will serve to indicate whether the valve is open or closed and also will indicate when the valve is moving, in response to the application of fluid pressure, to one or the other of the opposed pistons. That part of the rod 15 which extends beyond the valve housing, preferably is enclosed by a transparent, capsule-like housing 16.

In Figure 1 of the drawings, a means for controlling the fluid pressure for operation of the valve is shown in diagram. It will be understood that this or equivalent means may be provided and be operable either at the valve location, or at a remote control station. As shown, operating fluid pressure is maintained by a pump P, in conjunction with a reservoir R. A control valve C, e. g. of the rotary plug type, is operable to admit pressure, selectively, to either of the operating pistons 8 and as shown in Figure 2, a lap position of the valve will be effective to admit pressure, simultaneously, to both pistons. The usefulness of this lap position of the valve for controlling the operating pressure is to hold the valve, e. g. in any intermediate position of its movements while being opened or closed. When the valve C is positioned to actuate either of the pistons, it also acts to connect the opposite piston to the reservoir R, which latter preferably is at atmospheric pressure.

Having described an operable embodiment of my invention, it will be evident to those skilled in the art that various changes and modifications may be made therein without departing from the spirit or scope of my invention, as the same is defined by the following claims.

I claim:

1. In a sliding gate valve, the gate assembly being formed of two relatively movable expansible parts that by mutual wedging action of one part against the other, in relative endwise movement in either direction, can be expanded into sealing engagement with the valve seats in both open and closed positions, and can be collapsed to a centered position of minimum lateral dimension in order to relieve sealing pressure during the joint movement of both said parts, the combination comprising: a valve housing; seats therein to guide the gate assembly in its opening and closing movements and against which the gate assembly is expanded into sealing engagement, in both its open and closed positions; fixed abutments within the housing adjacent opposite ends thereof to limit the endwise movement of one of the said gate parts at opposite ends of its travel; and fluid-pressure operating means enclosed within the said housing for moving the gate assembly to its open and closed positions, the said means being operatively connected with the other one of the said two expansible gate parts at opposite ends thereof, and, when said gate assembly is sealed in either open or closed position, operating in response to a fluid-pressure supply to first move said other gate part relative to said one part in order to collapse the gate parts and thereby relieve the sealing pressure, to then directly engage and push both parts until the said first named part is stopped by contact with one of said abutments, and to then move the other part relative thereto whereby both parts are wedged into sealing engagement with the valve seats, in either the open or closed position of the valve.

2. Fluid-pressure means for positively operating a gate valve of the through way conduit type in which the sliding gate assembly is formed of two interfitting parts each having a double taper on its mating surface such that with the entire mating surfaces of the two parts in contact, the lateral over-all dimension of the gate assembly will be a minimum, and endwise movement of one part, in either direction relative to the other, will increase the lateral overall dimension of the gate assembly to effect sealing engagement of the two parts with the valve seats, the combination comprising: a valve housing; valve seats therein forming guides for the sliding gate assembly; fixed abutments within the housing for limiting the sliding movement of one of the gate parts at both ends of its travel; a pair of opposed fluid-pressure responsive pistons, mounted within the valve housing, one at each end thereof with the gate parts therebetween; and means acting in parallel paths for transmitting the thrust of each of said pistons to one end of each of the two gate parts, the said means acting to direct the thrust application in two parallel paths that are in line with the ends of the gate parts and with the thrust in one path being effective in advance of the thrust in the other path, whereby when the gate assembly is sealed in either open or closed position one gate part is first moved endwise relative to the other, and then both parts are moved in unison after the initial movement of one part relative to the other.

3. In a sliding gate valve, the gate assembly being formed of two relatively movable expansible parts that by mutual wedging action of one part against the other, in relative endwise movement in either direction, can be expanded into sealing engagement with the valve seats in both open and closed positions, and can be collapsed open and closed positions, and can be collapsed to a centered position of minimum lateral dimension in order to relieve sealing pressure during the joint movement of both said parts, the combination comprising: a valve housing; seats therein to guide the gate assembly in its opening and closing movements and against which the valve gate assembly is expanded into sealing engagement, in both its open and closed positions; fixed abutments within the housing adjacent opposite ends thereof to limit the endwise movement of one of the said gate parts at opposite ends of its travel; a pair of opposed fluid-pressure operating means within the housing, one at each end thereof, for positively moving the gate assembly to its open and closed positions, each of said operating means being connected to the adjacent end of the other one of the said expansible gate parts with the latter serving as a rigid connection between the two opposed gate-operating means; and means operating in conjunction with each of the fluid-pressure operating means for engaging and moving the said one of said gate parts after the other one has been moved sufficiently, from its valve open or valve closed position, to collapse the gate assembly and thereby relieve the sealing pressure on the valve seats.

4. The combination as recited in claim 3, in which the final means is yielding, in order to permit limited relative movement of the said gate parts, after the one of them is stopped by engagement with one of the said abutments.

5. The combination as recited in claim 3, with an additional means for selectively controlling the admission of fluid-pressure to each of the opposed gate-operating means.

6. A gate valve of the through conduit type, the gate assembly of which is formed of two relatively movable expansible parts that by mutual wedging action of one part against the other, in relative endwise movement in either direction, can be expanded into sealing engagement with the valve seats in both open and closed positions, and can be collapsed to a centered position of minimum lateral dimension in order to relieve sealing pressure during the joint movement of both said parts, the combination comprising: a valve housing; seats therein to guide the gate assembly in its opening and closing movements and against which the gate assembly is expanded into sealing engagement, in both its open and closed positions; fixed abutments within the housing adjacent opposite ends thereof to limit the endwise movement of one of the said gate parts at opposite ends of its travel; and a pair of opposed fluid-pressure valve-operating means within the housing, one at each end thereof, and comprising cylinders having closed outer ends with their inner ends in open communication with the interior of the said housing, a piston within each cylinder, each piston being positively connected by a rod to the other one of the said valve gate parts, at opposite ends thereof, a coil spring surrounding each of the piston rods and compressed between the piston and a follower mounted to slide on the said rods, the said follower adapted to engage the ends of both of the valve gate parts, each of the said springs and followers becoming effective upon application of fluid pressure to its associated piston to move the said one of the gate parts after the other one of them has been moved by the piston connected thereto, from its valve open or valve closed position, to an extent sufficient to collapse the gate parts.

7. A gate valve of the through conduit type the gate assembly of which is formed of two relatively movable parts which by mutual wedging action of one part against the other, in relative inclusive movement in either direction, can be expanded laterally into sealing engagement with the valve seats in both open and closed positions and can be collapsed to relieve sealing pressure during joint movement of said parts, the combination comprising: a valve housing; seats therein to guide the gate assembly in its opening and closing movements and against which the gate assembly is expanded into sealing engagement, in both its open and closed positions; fixed abutments within the housing adjacent opposite ends thereof to limit the endwise movement of one of the said gate parts at opposite ends of its travel; and a pair of fluid-pressure valve-operating means enclosed within the housing, one at each end thereof, for positively moving the gate assembly from a sealed open position to a sealed closed position and vice versa, each of said operating means having operating engagement with each of the gate parts to permit limited relative movement between the gate parts so that when said gate assembly is in sealed open or sealed closed position the said means when energized will engage and positively move only one of the gate parts until both gate parts are in the collapsed position, will then positively move both parts, in unison, until movement of the one part is stopped by an abutment, and will continue the movement of the other part until the expanded sealed position of the two parts is attained.

8. A valve of the gate type with fluid-pressure means for operating the valve to its open and closed positions, the combination comprising: a housing forming a valve chamber having aligned ports provided with opposed parallel valve seats; a ported expansible valve gate assembly mounted for rectilinear movement between said seats to open and close the valve, said assembly comprising a pair of double-tapered mutually wedging elements that are oppositely displaceable in a direction normal to that of their rectilinear movement by relative endwise movement in either direction from a centered position corresponding to the minimum overall lateral dimension of said gate assembly, in order to expand said assembly and effect sealing engagement of said elements with said valve seats in both the open and closed positions of the valve; fixed abutments within said housing to limit the rectilinear movement of one of said gate elements at the opposite ends of its travel; fluid-pressure responsive means for positively moving the other of said elements in either direction of its travel; and resilient means interposed between said fluid-pressure responsive means and said one element, whereby said fluid-pressure responsive means is adapted to move both said elements between limits defined by said fixed abutments and to move said other element beyond said limits when said one element is stopped by a fixed abutment, in order to positively expand said gate assembly adjacent both ends of its travel and effect sealing engagement of said elements with said valve seats.

9. A valve of the gate type with fluid-pressure means for operating the valve to its open and closed positions; the combination comprising: a housing forming a valve chamber having aligned ports provided with opposed parallel valve seats; a ported expansible valve gate assembly mounted for rectilinear movement between said seats to open and close the valve, said assembly comprising a pair of double-tapered mutually wedging elements that are oppositely displaceable in a direction normal to that of their rectilinear movement by relative endwise movement in either direction, from a centered position corresponding to the minimum overall lateral dimension of said gate assembly, in order to expand said assembly and effect sealing engagement of said elements with said valve seats in both the open and closed positions of the valve; fixed abutments within said housing to limit the rectilinear movement of one of said gate elements at the opposite ends of its travel; and fluid-pressure responsive means for simultaneously moving both said elements in either direction of their travel within limits defined by said fixed abutments, said means having positive engagement with the other of said elements and resilient engagement with said one element, whereby said means is adapted to move said other element beyond said limits when said one element is stopped by a said fixed abutment.

10. A valve of the gate type with fluid-pressure means for operating the valve to its open and closed positions; the combination comprising: a housing forming a valve chamber having aligned ports provided with opposed parallel valve seats; a ported expansible valve gate assembly mounted for rectilinear movement between said seats to open and close the valve, said assembly comprising a pair of double-tapered mutually wedging elements that are oppositely displaceable in a direction normal to that of their rectilinear movement by relative endwise movement in either direction from a centered position corresponding to the minimum overall lateral dimension of said gate assembly, in order to expand said assembly and effect sealing engagement of said elements with said valve seats in both the open and closed positions of the valve; fixed abutments within said housing to limit the rectilinear movement of one of said gate elements at the opposite ends of its travel; a pair of opposed fluid-pressure-operated pistons mounted at opposite ends of said gate assembly; rigid means for transmitting the thrust of each of said pistons to a corresponding end of the other of said gate elements; and resilient means for transmitting the thrust of each of said pistons to a corresponding end of said one element, there being lost motion between said resilient means and a said corresponding end of said one element when said gate assembly is in expanded position at either end of its travel, the extent of said lost motion being substantially equal to the amount of relative endwise displacement between said elements, whereby in moving said gate assembly to open and closed positions of the valve a said piston first moves said other element endwise relative to said one element, in order to collapse said assembly, and then moves both said elements simultaneously toward the other end of their travel.

11. A valve of the gate type with fluid-pressure means for operating the valve to its open and closed positions, the combination comprising: a housing forming a valve chamber having aligned ports provided with opposed parallel valve seats; a ported expansible valve gate assembly mounted for rectilinear movement between said seats to open and close the valve, said gate assembly comprising a pair of double-tapered mutually wedging elements that are oppositely displaceable in a direction normal to that of their rectilinear movement by relative endwise movement in either direction, from a centered position corresponding to the minimum overall lateral dimension of said assembly, in order to expand said gate assembly and effect sealing engagement of said elements with said valve seats in both the open and closed positions of the valve; fixed abutments within said housing to limit the rectilinear movement of one of said gate elements at the opposite ends of its travel; and fluid-pressure responsive means for moving said gate assembly to its open and closed positions, said means being engageable with opposite ends of said assembly and, when said assembly is expanded in either open or closed position, operating in response to fluid-pressure supply to first engage and move the other of said gate elements relative to said one element to center said elements and thereby relieve the sealing pressure, to then engage and move both said elements until said one element is stopped by contact with one of said abutments, and to then continue to move said other element to thereby expand said gate assembly and effect sealing engagement of said elements with their valve seats.

FRED McMANIS.

REFERENCES CITED

The following references are of record in the file of this patent:

UNITED STATES PATENTS

| Number | Name | Date |
| --- | --- | --- |
| Re. 20,101 | Laurent | Sept. 8, 1936 |
| 283,479 | Galvin | Aug. 21, 1883 |
| 430,089 | Sewall | June 10, 1890 |
| 715,745 | Bickford | Dec. 16, 1902 |
| 894,784 | Vivian | July 28, 1908 |
| 1,819,043 | Sleeper | Aug. 18, 1931 |
| 1,986,429 | Dunham | Jan. 1, 1935 |
| 2,166,304 | Laurent | July 18, 1939 |
| 2,337,841 | Shaffer | Dec. 28, 1943 |

FOREIGN PATENTS

| Number | Country | Date |
| --- | --- | --- |
| 13,828 | Great Britain | June 20, 1903 |